Feb. 23, 1960　　　　D. H. NAU ET AL　　　　2,926,022
FOOD CART
Filed July 31, 1957　　　　2 Sheets-Sheet 1
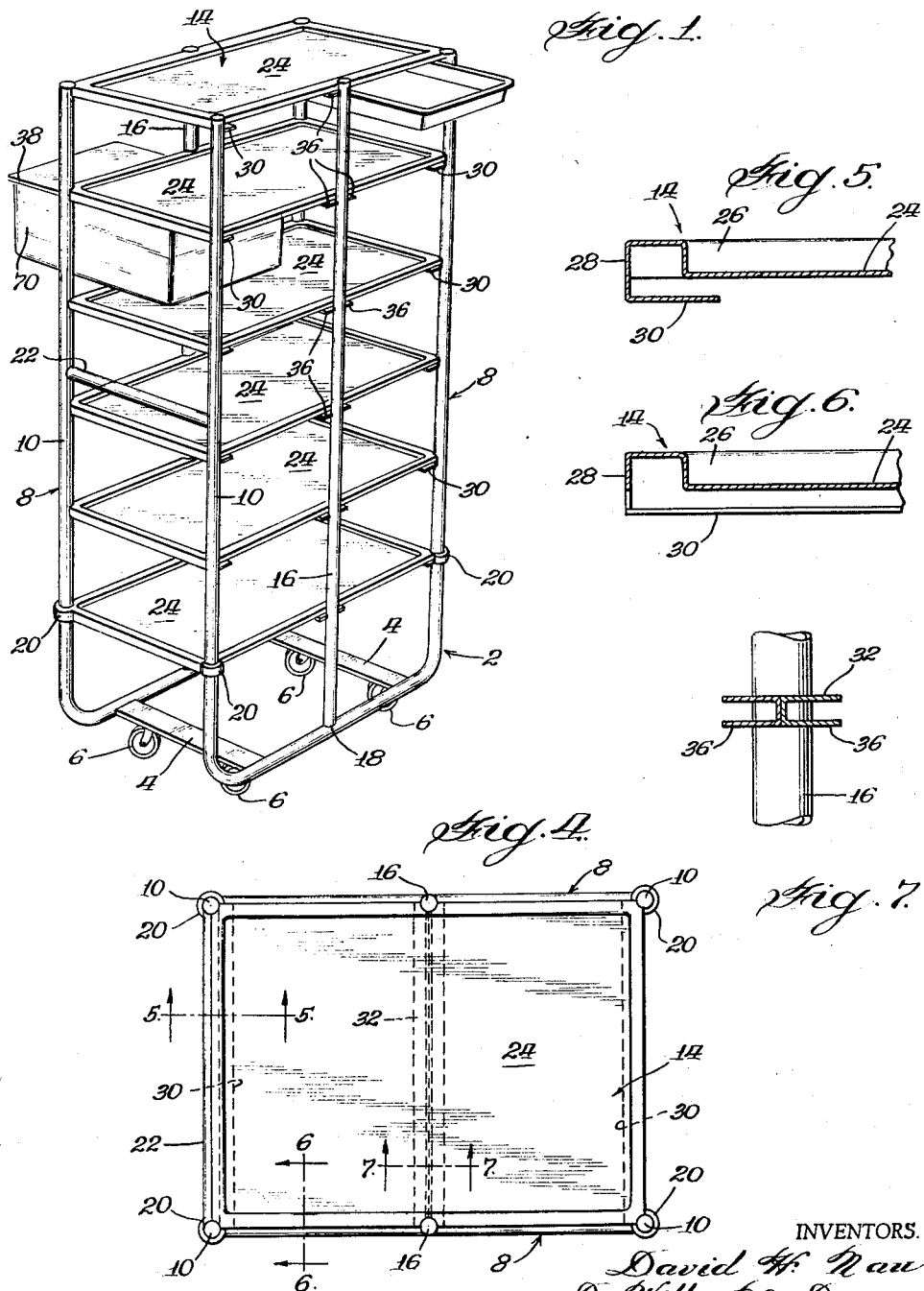
INVENTORS.
David H. Nau
DeWitt H. Doane
By Neil J. Donnell
Atty Feb. 23, 1960    D. H. NAU ET AL    2,926,022
FOOD CART
Filed July 31, 1957    2 Sheets-Sheet 2
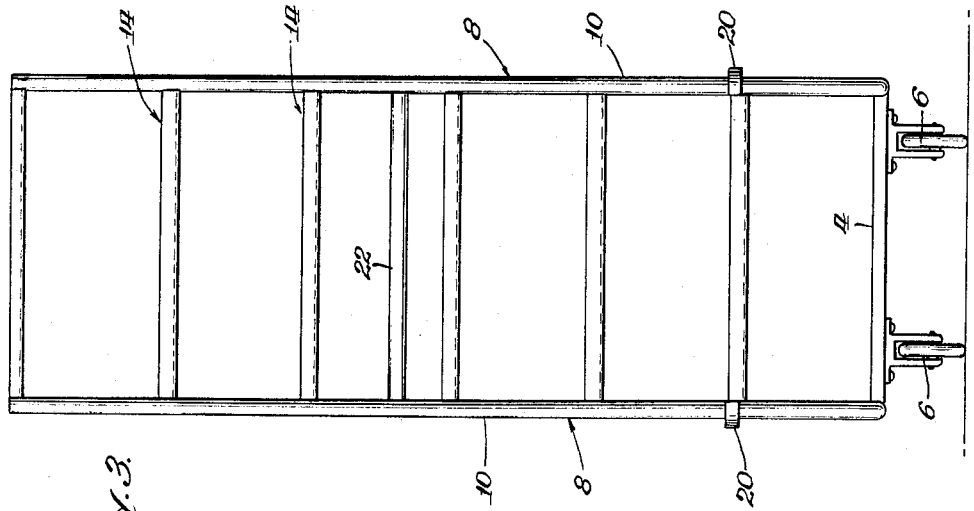
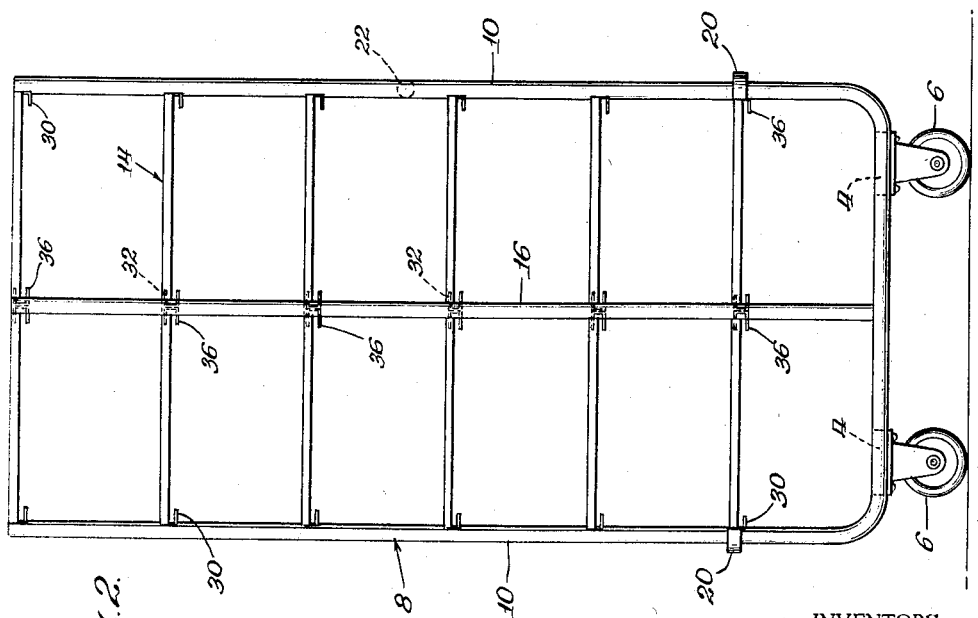
INVENTORS.
David H. Nau
DeWitt W. Doane
By: Neil J. Driscoll Atty.

United States Patent Office 2,926,022
Patented Feb. 23, 1960

2,926,022

FOOD CART

David H. Nau, Chicago, and DeWitt H. Doane, Mount Prospect, Ill.

Application July 31, 1957, Serial No. 675,343

5 Claims. (Cl. 280—79.3)

The invention relates to a food cart having particular utility in the sanitary transport and temporary disposition of large volumes of various types of prepared foods.

As is well known to those skilled in the art, the problems incident to the transport and sanitary maintenance of large amounts of prepared food in high volume restaurant operation and the like have been numerous. For example, the overall low financial return from investment in this type of business as well as the type and quality of work involved dictates that personnel in the lower efficiency brackets be employed. It will also be appreciated that many different types of food must be moved from preparation areas to final serving areas and this transport must take into account the maintenance of the food under proper conditions after preparation and before serving as well as the efficient moving of such food. Heretofore the art required a plurality of various types of transporting carts, that is, frequently carts of different design were used for cold food, hot food, frozen food, salads and soiled dish removal. The combination of inefficient personnel and multiplicity of transporting carts has plagued the industry with such difficulties as congestion, accidents during service, food delivered to the dining area in an improper condition and in some cases food spoilage or contamination. The lukewarm hot plate and the melted ice cream are facts of virtual universal experience to persons attending convention banquets and the like. Further, multiple purpose carting obviously requires a relatively large equipment investment much to the dissatisfaction of persons engaging in this business.

With the advent of new systems of food handling employing preserving banks of heating or refrigerating equipment storage areas, the conventional transporting cart arrangements became even more difficult to work with and recognition of a need for improved cart arrangements to complement the new systems of food handling escaped those familiar with this art.

Accordingly, it is a general object of the invention to provide a food carting arrangement which answers the needs of and can be complementally used with present day food dispensing systems.

It is a further object of the invention to provide a food carting arrangement of simple design and construction that will function for all types of food transportation and thereby lower the restaurateur's equipment investment.

It is a specific object of the invention to provide a food carting arrangement of the type described which is readily adaptable to the conventional pan arrangements currently in use for the preparation and storage of food thereby avoiding multiple food transfer.

It is an additional specific object of the invention to provide a cart which eliminates the need for pan cover arrangements and the like.

It is also an object of the invention to provide a food carting arrangement readily accommodating various pan sizes currently used in the industry.

These and other objects of the invention will become apparent in the course of the following description and from an examination of the concerned drawings, wherein:

Figure 1 is a perspective view of a preferred embodiment of the invention,

Figure 2 is a side elevational view of the structure shown in Figure 1,

Figure 3 is an end elevational view of the structure shown in Figure 1,

Figure 4 is a top view of the structure shown in Figure 1,

Figure 5 is a fragmentary sectional view taken along line 5—5 of Figure 4,

Figure 6 is a fragmentary sectional view taken along line 6—6 of Figure 4, and

Figure 7 is a fragmentary sectional view taken along line 7—7 of Figure 4.

Describing the invention in detail, attention is directed first to Figure 1 wherein the cart, indicated generally at 2, may in the preferred form comprise a pair of spaced supporting members 4, 4 having conventionally secured therebelow wheel and axle arrangements 6, 6. Upwardly facing U-shaped, tubular members 8 are secured to and outboardly of the members 4, 4 and on opposite sides thereof. The vertical supports 10, 10 of the U-shaped members 8 serve as the corner posts of the cart 2.

A plurality of rectangular shelves 14, 14 may be vertically spaced from each other and interposed between the posts 10 and respectively secured thereto in any conventional manner at each of their respective corners. It will be noted that in the preferred embodiment of the invention the shelves 14, 14 are equally spaced from each other, said spacing being sufficient to accommodate the insertion, between adjacent shelves, of any of the food pans having depths currently in use in the art today.

To provide additional support for the shelves 14, a pair of members 16, 16 are positioned on opposite sides of the cart 2 so that their lower ends abut and are secured to the joining portions of the U-shaped members 8, as at 18. The members 16 extend upwardly and are fixedly secured to the central portion of the respective shelves 14. This construction provides the required strength and rigidity insuring proper support for the food pans and the like as hereinafter described.

Directing attention to Figures 2 through 7, it will be seen that the members 10, 10 may be provided with resilient bumpers 20, 20 of rubber material or the like, preferably adjacent the lower ends of each member 10. A handle 22 is provided at one side of the cart and joins two of the members 10 to provide convenient means for the restaurant employee to grasp and move the entire arrangement.

Considering Figures 4 through 7, it will be particularly noted that each shelf 14 comprises a peripherally flat center section 24 having an upraised lip 26 peripherally disposed therearound. It will be noted that this lip or flange 26 is arranged on opposed sides of each shelf 14 to bend downwardly, as at 28, to a point below the central portion 24 and then inwardly underneath and in spaced relation to the plane of the central portion 24 so as to provide a lip or flange 30 running the entire width of each shelf. Centrally, of each shelf 14 a pair of U-shaped channels 32, 32 may be secured in back to back relationship so that the opposite ends thereof are securely fastened to the central members 16. The adjacent upper elements of each U-shaped channel may be secured to the lower surface of each adjacent shelf 14. Thus it will be seen that the flanges 30, 30 and the lower elements 36 of each U-shaped member 32, 32 provide ledges immediately below the respective shelves 14 to slidably receive the flanges 38 on opposite sides of each food pan 40. This slidable and supporting reception of typical food pans from the underside of each shelf 14 is clearly illustrated in Figure 1, It will be noted that the food carting arrangement illustrated provides for maximum use of the cart for the storage and transport of food. Foods normally prepared or stored in pans may be quickly positioned on the cart by merely slidably mounting the pan below one of the shelves 14. It will be noted that mounting and transporting the pans in this manner eliminates the need for food transfer from the preparing or storage pans to transporting containers. Also, the novel mounting of the pans below each shelf 14 eliminates the need for covers while satisfying the sanitary requirements normally incident to the transport of food for comparatively long distances. Both hot and cold food may, of course, be transported in this manner.

Considering other types of foods, such as salads, prepared plates or the like, it may be noted that the upper surface of the shelves 14 are also available to support and accommodate transportation of same. Additionally, the upper surface of the shelves 14 may be utilized to provide temporary storage and transport of soiled dishes and the like.

A particular important aspect of the carting arrangement involves the circulation of air in and around the supported and covered food pans. A single thickness of metal surrounds all carried foods thus insuring even heat transfer. This has the particular advantages in that the carts are designed to be physically and entirely placed inside the mentioned heating or refrigerating equipment whereby temperature variation within the carried food is avoided.

Thus it will be seen that we have provided a novel food transporting cart arrangement which is readily adaptable to the transport of various classes of prepared foods found in restaurant operation. This generic adaptability of the disclosed cart reduces the investment required on the part of the restaurateur. Further, the structural feature recited accommodates the use of conventional food storing pans further eliminating the need for special equipment in the transportation of food.

The invention as shown is by way of illustration and not limitation and may be subject to various modifications without departing from the spirit thereof or the scope of the appended claims.

What is claimed is:

1. In a food cart transportation arrangement, a pair of spaced supporting base members, wheel means secured to the underside of the supporting base members, a pair of upwardly facing U-shaped members secured to the opposed outer edges of said supporting members, said U-shaped members having their vertical portions in spaced parallel relationship to each other, a plurality of vertically spaced shelves interposed between and corner-connected to said vertical portions, said shelves having a flat central section and a lip projecting upwardly from the central section and peripherally therearound, spaced parallel pairs of inwardly directed flanges extending transversely of the arrangement and immediately below said shelves, open top pan means having opposed parallel edges supportably and slidably received on the respective pairs of said flanges and thereby accommodating removable pan suspension from either side of said arrangement, said flanges and edges being arranged so that the flat section provides a cover for said pan means when the latter is in position on the arrangement.

2. In a food cart transportation arrangement according to claim 1, wherein each pair of said flanges projects inwardly to underlie portions of said central section as seen in elevational view.

3. In a food cart transportation arrangement according to claim 2, wherein each shelf has two pair of said flanges.

4. In a food cart transportation arrangement according to claim 3, and including vertical supporting posts having their lower ends connected to the U-shaped members centrally thereof, said posts projecting upwardly in spaced parallel relation to said vertical portions and to each other, said posts being supportably connected to the respective shelves.

5. In a food cart transportation arrangement according to claim 4, wherein one flange of each pair extends from one of said vertical portions to another of said vertical portions, and the other flange of each pair extends from one of said posts to another of said posts.

References Cited in the file of this patent

UNITED STATES PATENTS

| | | |
|---|---|---|
| 912,035 | Schaefle | Feb. 9, 1909 |
| 1,367,672 | Smith | Feb. 8, 1921 |
| 1,691,621 | Young | Nov. 13, 1928 |
| 1,943,023 | Langenkamp et al. | Jan. 9, 1934 |
| 2,194,177 | Rundell | Mar. 19, 1940 |
| 2,689,778 | Chambers et al. | Sept. 21, 1954 |
| 2,820,559 | Armitage | Jan. 21, 1958 |